Figure 1:
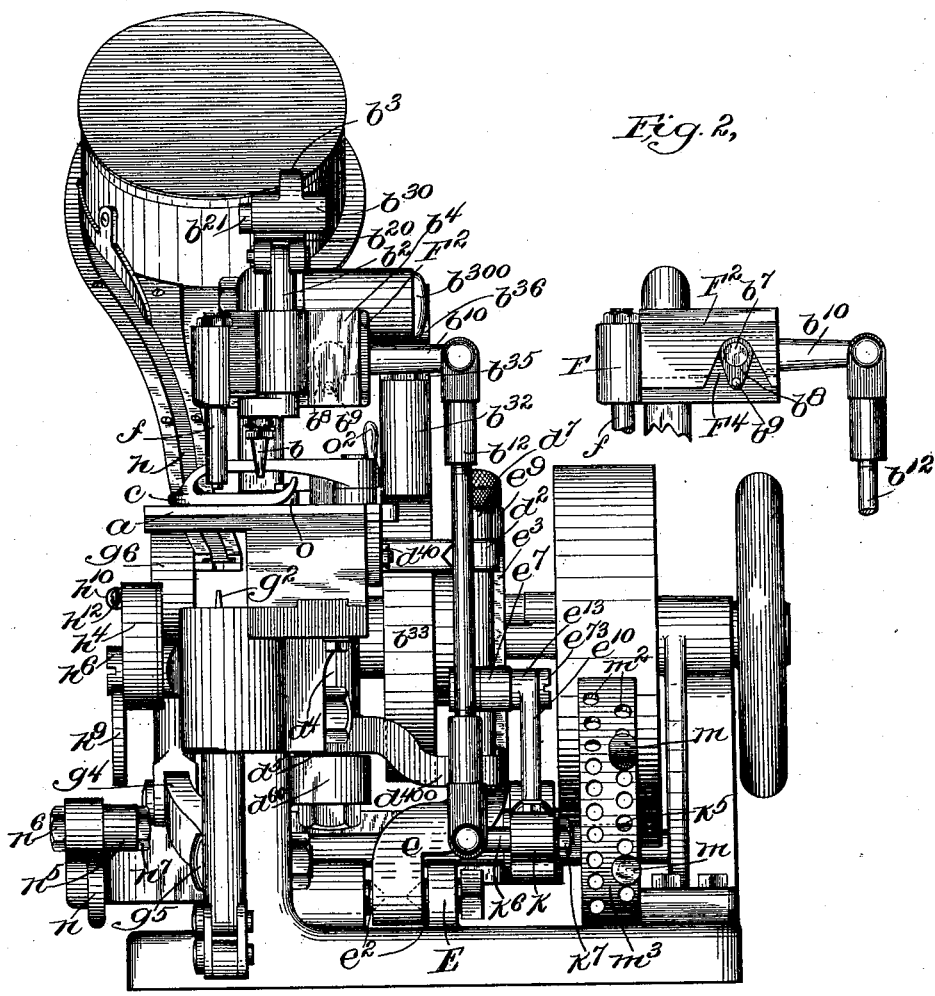
Figure 1:
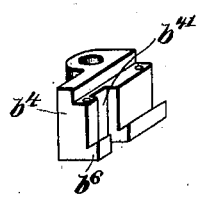

No. 628,290. Patented July 4, 1899.
W. L. WHITTEMORE & P. R. GLASS.
EYELETING MACHINE.
(Application filed Feb. 14, 1898.)

(No Model.) 4 Sheets—Sheet 1.

Fig. 2ª,

Witnesses
Jas. J. Maloney.
H. J. Livermore

Inventors,
Walter L. Whittemore,
& Perley R. Glass.
by Jos. P. Livermore
att'y

No. 628,290. Patented July 4, 1899.
W. L. WHITTEMORE & P. R. GLASS.
EYELETING MACHINE.
(Application filed Feb. 14, 1898.)
(No Model.) 4 Sheets—Sheet 2.
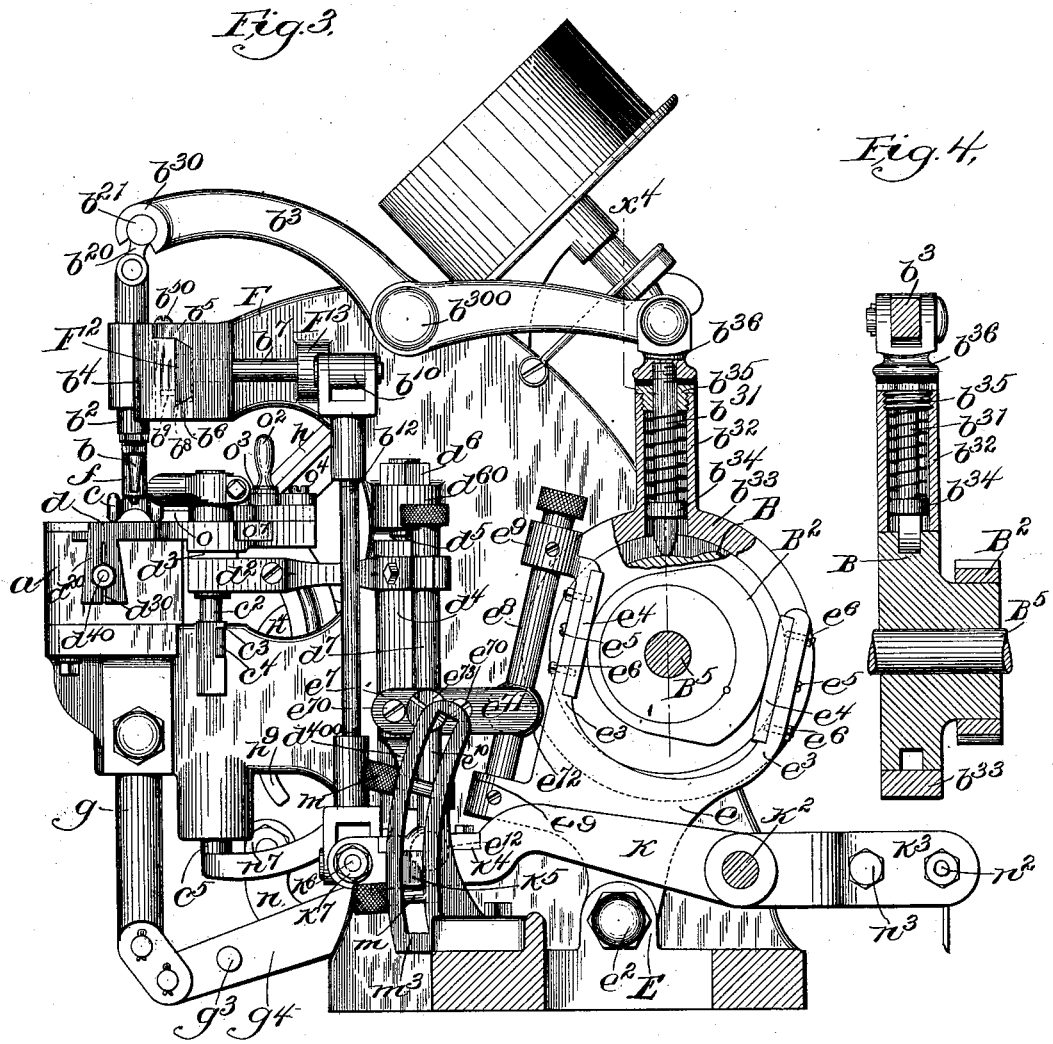
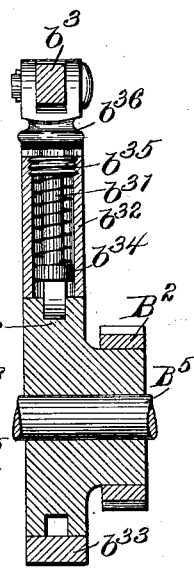
Witnesses
Jas. J. Maloney
J. P. Livermore
Inventors.
Walter L. Whittemore
& Perley R. Glass,
by Jo. P. Livermore
Att'y.

No. 628,290. Patented July 4, 1899.
W. L. WHITTEMORE & P. R. GLASS.
EYELETING MACHINE.
(Application filed Feb. 14, 1898.)
(No Model.) 4 Sheets—Sheet 3.
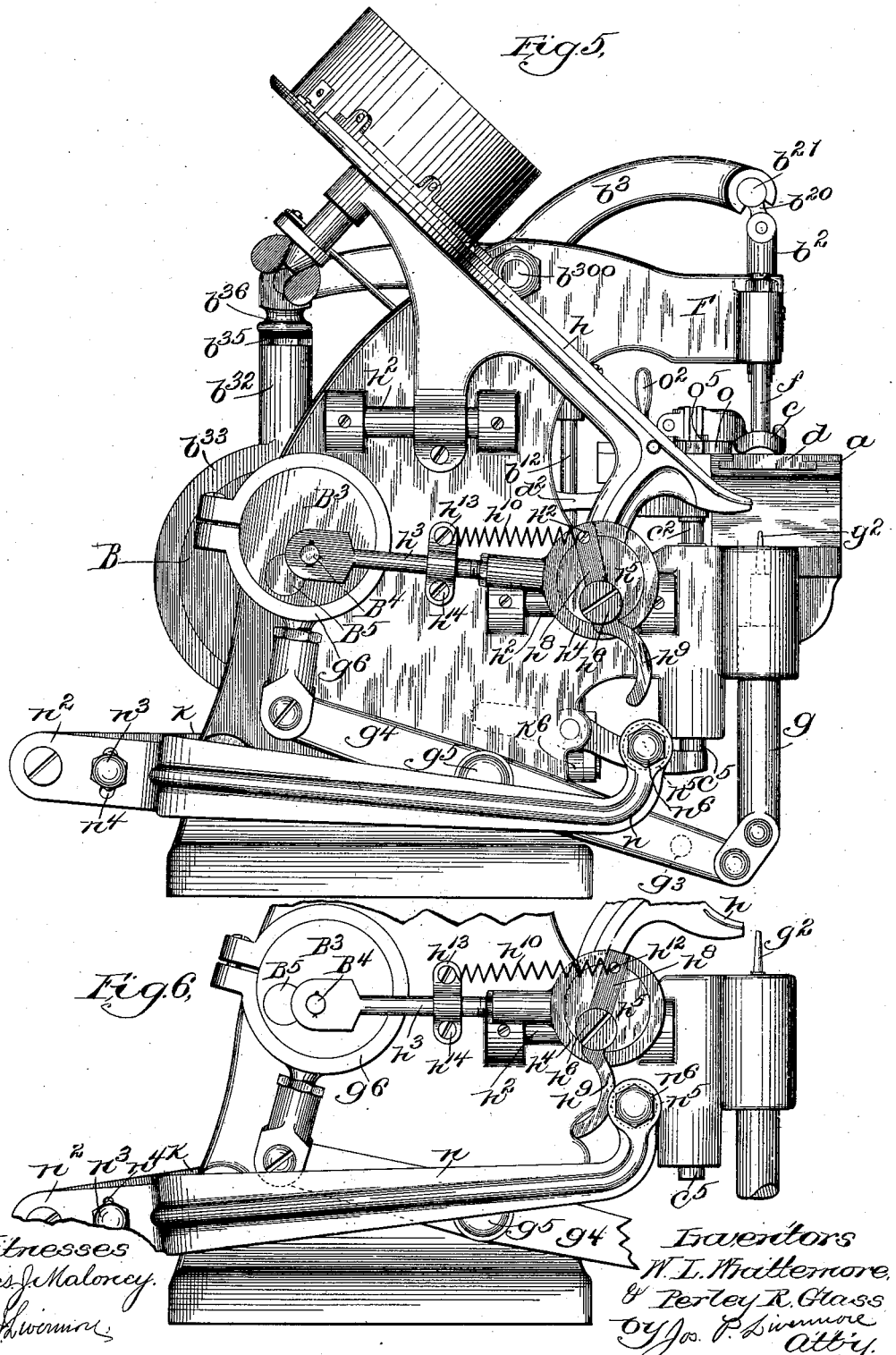

No. 628,290. Patented July 4, 1899.
W. L. WHITTEMORE & P. R. GLASS.
EYELETING MACHINE.
(Application filed Feb. 14, 1898.)
(No Model.) 4 Sheets—Sheet 4.
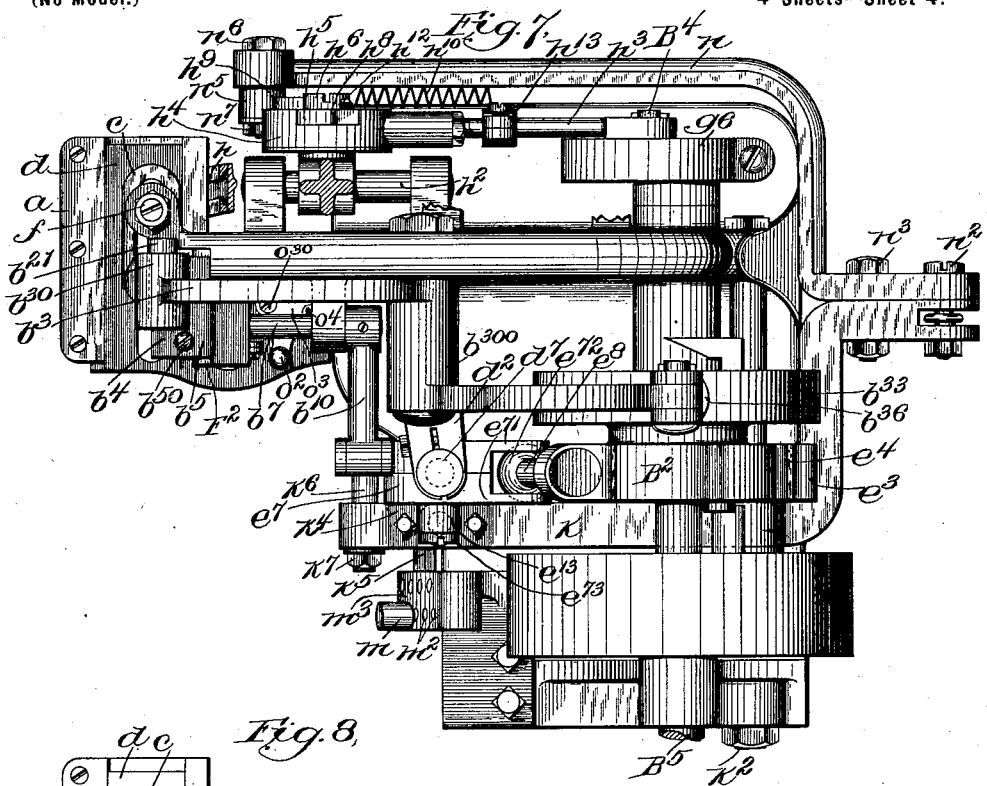
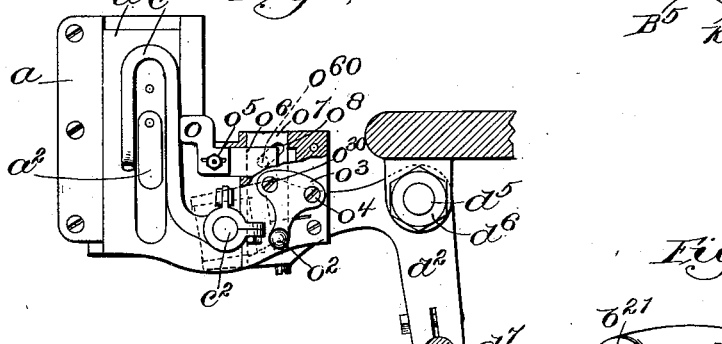
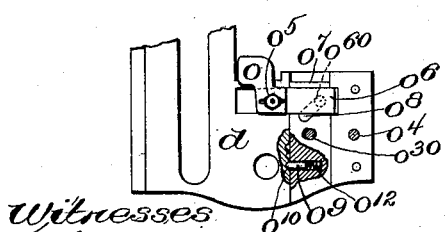
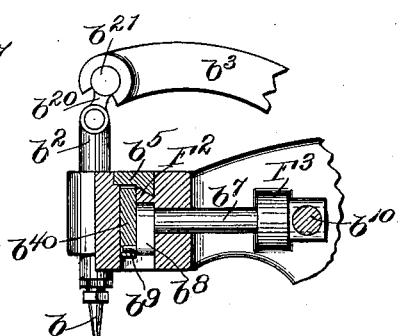
Witnesses
Jas. J. Maloney.
Inventors,
Walter L. Whittemore
& Perley R. Glass,
by Jno. P. Livermore
Att'y

UNITED STATES PATENT OFFICE.

WALTER L. WHITTEMORE AND PERLEY R. GLASS, OF QUINCY, MASSACHUSETTS, ASSIGNORS TO CHARLES WHITTEMORE, OF NEWTON, MASSACHUSETTS.

EYELETING-MACHINE.

SPECIFICATION forming part of Letters Patent No. 628,290, dated July 4, 1899.

Application filed February 14, 1898. Serial No. 670,238. (No model.)

*To all whom it may concern:*

Be it known that we, WALTER L. WHITTEMORE and PERLEY R. GLASS, of Quincy, in the county of Norfolk and State of Massachusetts, have invented an Improvement in Eyeleting-Machines, of which the following description, in connection with the accompanying drawings, is a specification, like letters on the drawings representing like parts.
The present invention relates to an eyeleting-machine of that class in which the stock is first punched and then fed forward by a stock-feeding device to eyelet-setting devices, so that the hole made by the punch is in proper position to receive an eyelet, the machine operating on substantially the principle and having the same general features as shown and described in a prior patent, No. 581,855, granted to P. R. Glass May 4, 1897. Machines of this class are used to a large extent for eyeleting shoe-uppers, in which it is usual to set eyelets in a certain number of holes and by the same operation to punch other holes in which lacing-studs are to be subsequently set. In this class of work it is desirable usually to space the non-eyeleted openings differently from the eyeleted openings—that is, at a greater or less distance apart, usually greater—and it is also desirable to provide means for readily changing the spacing of the eyeleted openings themselves or to have a part thereof differently spaced from another part.

It is the object of the present invention to arrange the machine so that it is easily adapted for all classes of work, and so that the spacing of the openings can be varied either by permanent adjustments or by a temporary variation within certain limits, which can be brought about by the operator while the machine is running, or by both. In all these changes in the spacing it is obviously necessary, if the punched holes are to receive eyelets, not only to change the extent of movement or throw of the stock-feeding device, but also to change the position of the punch relative to that of the eyelet-setting devices to correspond to the change in feed movement, so that the punched opening will be fed to the proper position to receive the eyelet, it being desirable to accomplish this in any event in order that the setting devices, whether an eyelet is presented thereto or not, may come together where there is an opening and not pinch the stock between them, and thus mar or disfigure the same. It is further desirable that the connection between the feed-shifting device and the punch-shifting means should be positive, so that it will be impossible for any variation between the two to occur, since such variation would result in the presentation of the eyelet at a place where there is no hole to receive it.

One of the objects of the present invention is to so arrange the punch and feeding device that the same adjustment will suffice for both, so that there can be no variation, and also to provide means whereby the adjustment may be permanent, or the devices rendered capable of being together shifted within certain predetermined limits. To this end the feed-slide (which operates substantially as shown and described in Patent No. 581,855 above cited) is shown as operated primarily by a movable member, such as a lever or rocker having a definite and constant range of movement, but is directly connected to an intermediate lever, and the point of connection between said member and said lever is capable of being shifted in such a manner as to obtain a variation in the throw of the said lever, there being also means for producing such a variation at the will of the attendant and for limiting the extent thereof, as by stops capable of being adjusted, as may be desired. In the same manner if a permanent change in adjustment is to be provided for the said stops may be arranged to lock the shifting means in any predetermined position, and thereby permanently change the relation between the movable member and the feed-lever to control the throw of the latter. The shifting means, which, as has been stated, are controlled by the attendant and limited by the stops aforesaid or positively locked in any desired position by said stops, are also positively connected with a device for shifting the position of the punch with relation to that of the setting devices, so that whatever change is made in the throw of the feeding device is accompanied by a corresponding change in the position of the punch, the result being that in all cases the feeding device will move the stock from the punch to the setting devices and cause the opening made by the former to be in a position to receive the eyelet from the latter.

In conjunction with the means for varying the throw of the feed and changing the position of the punch above described the machine is provided with a device of novel construction for arresting the forward movement of the eyelet-chute, (which chute is of the usual kind and reciprocates with relation to the setting devices,) so that the same will not present an eyelet to the setting devices if it is desired to merely punch a portion of the openings without setting eyelets therein. The said device for arresting the movement of the eyelet-chute is arranged in accordance with the present invention, so that it is normally operated in conjunction with the means for varying the feed, &c.; but it can also be operated by hand in case it is desired to prevent the setting of an eyelet without varying the distance between the holes, and said chute-arresting device is further arranged so that when it is desired not only to vary the distance between the openings by varying the feed-throw, &c., but also to eyelet each opening, it can be disconnected from the means which vary the feed, so as not to coöperate therewith.

The invention further consists in a novel construction and arrangement of the means for operating the punch-lever, whereby any deviation in the throw of the same due to wear may be compensated for, an actuating-cam being arranged to coact with an intermediate member adjustable with relation to the punch-lever. To restore this punch after its operation, a spring is employed, and the said spring is incased in a guide for said intermediate member. To avoid the necessity of connecting said member with the lever by means of a link, the guide therefor has a pivotal support coaxial with that of the cam, so that it is capable of oscillating movement as said member moves toward and from the cam-surface to follow the curve described by the point of connection between it and the punch-lever.

A further feature of the invention consists in the arrangement of all the parts of the machine, so that any of them can be easily adjusted to take up wear.

Figure 1 is a front elevation of a machine embodying the invention. Fig. 2 is a detail showing the guideway for the punch-carriage and means for moving the same, the said punch-carriage being removed. Fig. 2$^a$ is a perspective view of the back side of the punch-carriage. Fig. 3 is a sectional elevation of the right-hand side of the machine. Fig. 3$^a$ is a horizontal sectional detail on the line $x^3$ of Fig. 3. Fig. 4 is a transverse sectional detail on the line $x^4$ of Fig. 3; Fig. 5, an elevation of the machine at the left-hand side thereof; Fig. 6, a partial elevation showing the means for operating the eyelet-chute in a different position from that shown in Fig. 5; Fig. 7, a sectional plan with the eyelet-chute removed; Fig. 8, a detail, being a sectional plan view below the frame projection which supports the punch-carriage and the upper set to indicate the construction of the spreader or shifting gage, which varies the position of the edge of the stock with relation to the devices which operate thereon; Fig. 9, a detail, being a sectional plan of the feed-slide and gage; and Fig. 10, a sectional detail showing the construction of the punch-carriage.

In operating the machine the stock, which is supported on the table or work-support $a$, is first operated upon by the punch $b$ and is then engaged by and held between the gripper member $c$ and the surface of the feed-slide $d$, which is operated, as will be hereinafter described, through the agency of the rocker or operating-lever $e$, and said stock thus held is transferred by the movement of said feed-slide and gripper to a position to be operated upon by the setting devices, which are herein shown as the upper set or anvil $f$, fixed in an overhanging projection F of the frame, and the lower set $g$, which has a yielding finger $g^2$ to pick an eyelet from the eyelet-chute $h$ and insert the same into a hole made in the stock, the said finger yielding during the setting operation in the usual way.

The punch, stock-feeding device, eyelet-chute, and setting devices are operated, respectively, by the cams B and B$^2$, the eccentric disk B$^3$, and a pitman connected with the wrist-pin B$^4$ thereon, the said cams and eccentric all being mounted on the main shaft B$^5$, while the operating parts are timed to coöperate so as to produce a continuous automatic eyelet-setting operation.

As the feed-slide $d$ and gripper member $c$ move back after a complete punching and setting operation it is essential that the stock should be released thereby and again gripped when the feed mechanism reaches its initial position ready to again advance the stock. To thus separate the gripper from the feed-slide and release the stock, the said gripper is herein shown as connected with a rod $c^2$, having a recess $c^3$, adapted to ride along a projection $c^4$ from a rod $c^5$, which is adapted to be engaged by a projection $g^3$ from the lower set operating-lever $g^4$, which is pivoted at $g^5$ to the frame of the machine and adapted to be operated by the eccentric-strap $g^6$, surrounding the eccentric disk B$^3$. As the lower set rises, therefore, the gripper $c$ is lifted away from the stock, and the rod $c^2$, to which it is connected, rides along the arm $c^4$ in the rearward movement of the feed, at the end of which time the lower set descends and the gripper comes down upon the stock in response to the action of a spring, which is not herein shown, since it is substantially the same in operation as in the patents hereinbefore referred to and forms no part of the present invention.

The feed-slide $d$ is directly connected to a swinging lever $d^2$, hereinafter called the "intermediate" lever to distinguish it from the main operating-lever $e$, and to said lever is also connected the rod $c^2$, so that the slide and gripper move in unison, the said rod $c^2$ extending through and being vertically movable in a block $d^3$, arranged to compensate for the change in movement from the arc described by the end of the lever-arm $d^2$ to the straight line in which the feed-slide and gripper member move.

The instrumentalities thus far enumerated operate in substantially the same way and perform substantially the same functions as those of the prior patents above named, the stock being punched, advanced to the setting devices, and an eyelet set therein, this cycle of operations being automatic and continuous from the time the machine is started by the attendant to the time when it is stopped.

The distance between the holes punched obviously depends upon the range of movement or throw of the feed-slide, and in order to vary the spacing of the eyelets it is therefore necessary to vary the extent of movement of the feed. This has been heretofore accomplished by positively moving the feed-lever or operating device in one direction only to a certain predetermined limit at each operation thereof, but restoring the same by a yielding force, as that of a spring, and varying the throw by means of an adjustable or movable stop to limit the distance through which the lever can move in response to the stress of the spring. This arrangement is objectionable for the reason that the movement in both directions is not positive, so that at high speed the spring may not operate quickly enough or may operate too quickly and cause a rebound from the stop, so that there is a possibility of spoiling the material by not having the same properly presented to the eyelet sets if an eyelet is to be inserted or by not properly spacing the punched openings if eyelets are not to be inserted therein. In accordance with the present invention the feed-slide is moved positively in both directions by the action of the cam $B^2$, the intermediate lever $d^2$, which is directly connected with the feed-slide, being shown as an elbow-lever having a suitable bearing, in which it is adapted to be rocked or oscillated by the movement of the operating lever or rocker $e$, which coöperates with the cam $B^2$. The said rocker $e$ is shown as movable in a vertical plane and bearing on adjustable cones $e^2$, mounted in lugs E of the frame and provided with arms $e^3$, one at each side of the cam $B^2$, the arrangement of said arms and said cam being such that both of the said arms are always in contact with the cam-surface, so that the rocker $e$ is positively moved by said cam in both directions with no possibility of lost motion, the arms being furthermore shown as provided with adjustable bearing-plates $e^4$, adapted to be set up or moved toward the surface of the cam by means of screws $e^5$, so as to take up wear and compensate for any looseness of parts or inaccuracy of operation which would result therefrom. The said plates may be locked in their adjusted position in any suitable or usual way, as by means of nuts $e^6$. The lever $d^2$ is herein shown as secured to a vertical bearing member or rock-shaft $d^4$, mounted on cones $d^5$, one of said cones being adjustable and provided with a lock-nut $d^6$, the said cones being secured in suitable lugs $d^{60}$ on the main frame of the machine.

To transmit the movement of the rocker $e$, which moves in a vertical plane, to the lever $d^2$, which moves in a horizontal plane, the said rocker $e$ and lever $d^2$ are connected by means of a link or connecting member $e^7$, one end of which is directly secured to a rod $d^7$, which extends from one arm of the lever $d^2$ downward to a projection $d^{100}$ from the bearing member $d^4$, so that the horizontal movement of said connecting-piece produced by the rocking of the lever $e$ will properly oscillate the bearing member $d^4$ and the lever $d^2$ and produce the reciprocating movement thereof.

The member $e^7$ is shown as a yoke made in two parts, adapted to be clamped together by means of screws $e^{70}$, each part having a channel, so that the said channels together form a bore or opening for the vertical rod $d^7$, (the said opening being of such size as to admit of a free movement of the said member along the said rod, as will be hereinafter described,) and the other end has the two projections $e^{71}$, each of which has on its inner surface a spherical recess for a ball $e^{72}$, the said ball having a channel bored through it and being fitted upon a rod $e^8$, secured to projections $e^9$ from the rocker $e$. A ball-and-socket or universal joint is thus afforded to compensate for the change from the vertical oscillating movement of the rocker $e$ to the horizontal oscillating movement of the lever $d^2$, the other end of the member $e^7$ being of course free to turn on the rod $d^7$.

From the foregoing description it will be seen that the feed-slide is positively actuated in both directions, while the bearing parts are capable of adjustment to compensate for wear, so that it is practically impossible for any of the material operated upon to be spoiled by any failure of the feeding device to properly position the same.

It is desirable, as has been stated, in the operation of the machine to vary the throw or range of movement of the feed-lever, and also to make such variations, if necessary, while the machine is operating—as, for example, when in a shoe-upper a number of holes are to be made at a certain distance apart and those in the remainder of the series at a different distance apart. This is accomplished in accordance with the present invention by shifting the point of connection between the intermediate lever and the operating-lever, so as to move the same with relation to the fulcrum of one of the said levers without producing a corresponding change in its position relative to the fulcrum of the other. As herein shown, this may be practically accomplished by moving the connecting member $e^7$ along the rods $d^7$ and $e^8$, the said rods extending, as has been stated, through bores or openings in the parts of the said connecting member which bear thereon. Such a movement in this instance will result in changing the relation of the connecting member $e^7$ to the fulcrum of the rocker $e$, it being obvious that as the said connecting member is moved upward in the construction shown the point of connection will be moved away from the fulcrum of the rocker $e$, thus lengthening the throw of the feed-lever, since the connecting member still bears the same relation thereto. In order that the said change may be instantly made by the attendant without stopping the machine, the said member $e^7$ is shown as connected with a lever $k$, pivoted at $k^2$, and having an arm $k^3$, adapted, as indicated, to be connected with a treadle, (not herein shown,) so that the attendant while operating the said treadle can instantly shift the point of connection and correspondingly vary the length of feed and distance between the holes punched in the stock. As herein shown, the said lever is connected with the member $e^7$ by means of a link $e^{10}$, having at one end a ball $e^{12}$, held in a socket in the lever $k$ by means of a plate $k^4$, which may be bolted or otherwise suitably secured in position, and the said link at the opposite end is provided with a hub $e^{13}$, having a bearing on a projection from the member $e^7$, upon which it is held by means of a screw $e^{73}$. The joints constructed in this way afford the proper compensation for the change from the path of movement of the lever to the path of movement of the connecting member $e^7$.

To fix the limit of movement of the lever so that the throw of the feed-slide when varied by the act of the attendant shall always have the same extent of variation, the said lever is shown as controlled in its movement by stops $m$, which may be pins capable of being inserted in openings $m^2$ in a rack or support $m^3$, so arranged that when the said pins are placed in any of the openings they will cross the path of the lever or a projection therefrom, the said lever being herein shown as provided with a lateral projection $k^5$ for the purpose. The rack is preferably provided with a double line of holes, so that pins of sufficient strength can be employed and at the same time a very fine adjustment provided for. With this construction the normal range of feed movement is determined by the position of the lower pin $m$, the weight of the lever and the parts carried thereby causing the projection $k^5$ to remain in contact with the said pin $m$, except when the said lever is rocked by the attendant. It is obvious that any permanent adjustment of the feed may be made by properly placing the said lower pin, and in cases where it is desirable not to shift or vary the feed movement during the operation of the machine it is obvious that the lever can be locked by placing the upper pin in such an opening as will hold it directly over the projection $k^5$, so as to prevent the upward movement of the lever from any cause.

It is obvious that if eyelets are to be set in all the holes and the spacing is to be varied during the operation of the machine the relation of the punch to the setting devices must be changed to correspond to the feed movement in order that the hole punched may be moved to the right position to receive the eyelet. It is also desirable that the movement of the punch with relation to the setting devices should be positive in both directions and should be accomplished by the same means which accomplish the feed variation, so that by no possibility can a change be effected in one part without effecting a corresponding change in the other part. To this end the punch, which is mounted in a carriage capable of lateral movement toward and from the setting devices, is arranged to be operated directly by the movement of the lever $k$, so that whether the parts are shifted in the operation of the machine or permanently adjusted, as hereinbefore described, the punch will always be moved to correspond to the change in feed movement.

As herein shown, the punch $b$ is mounted on a plunger $b^2$, connected, as will be hereinafter described, with a lever $b^3$, arranged to be operated by the cam B to move the said plunger and the punch carried thereby toward and from the stock as it lies on the table $a$, which is shown as provided with an anvil $a^2$, Fig. 8, which is elongated to accommodate the lateral movement of the punch. The said plunger is vertically movable in a suitable socket forming part of the carriage $b^4$, which has a dovetailed guide-groove formed by projections $b^5$ and $b^6$, adapted to slide along an undercut guide-tongue $F^2$ upon the face of the overhanging projection F of the frame. The upper projection $b^5$ is shown as secured to the body of the carriage $b^4$ by means of screws $b^{50}$ for convenience in assembling the parts. The upper set $f$ is fixed with relation to the overhanging projection F, so that the lateral movement of the punch-carriage obviously varies the distance between the set and the punch.

To admit of a lateral movement of the punch-carriage with relation to the punch-lever $b^3$, the punch-plunger is shown as connected by a link $b^{20}$ with the said lever, the said link having an upper cylindrical bearing portion $b^{21}$ bearing in the socket $b^{30}$ of the lever $b^3$, in which socket it is laterally movable. The lateral movement of the punch-carriage is provided for by means of a rock-shaft $b^7$, having a suitable bearing $F^3$ at one end and extending through and bearing in the projection F² at the other end, the said rock-shaft having an arm $b^8$ flush with the surface of the projection F², which surface is cut away at F⁴ (see Fig. 2) to accommodate the movement of said arm in response to the rocking of the rock-shaft $b^7$. The said arm $b^8$ has a pin or projection $b^9$, which is connected with the punch-carriage $b^4$, as indicated in dotted lines, Fig. 1, so that the rocking of the said shaft produces a corresponding lateral movement of the carriage. As herein shown, said pin coacts directly with a block $b^{40}$, held in a suitable socket $b^{41}$, Fig. 2ª, in said carriage, so that if the pin wears loose a new block may be substituted without renewing the permanent parts. (See Fig. 10.) The block $b^{40}$ is free to move vertically in the socket $b^{41}$, and to thereby compensate for the swinging movement of the arm $b^8$, as such movement is converted into the reciprocating movement of the punch-carriage. The pin can thus have a snug working fit in the opening in the block, so that there is substantially no lost motion, while, as stated, it is a simple matter to repair the device if the pin or block wears loose.

To operate the rock-shaft, the same is provided with an arm $b^{10}$, which is connected by means of a link or rod $b^{12}$ with the lever $k$, the said lever being shown as provided with a lateral projection $k^6$, secured therein by a nut $k^7$. The said rod $b^{12}$ is shown as forked at its ends, the arm $b^{10}$ and projection $k^6$ being pivotally secured between the fork members.

To produce the operative movement of the punch, the lever $b^3$ is pivoted at $b^{300}$ and provided at its end with a projection $b^{31}$, pivotally connected to said end and extending into the path of the cam projection B, so as to be moved upward by said cam projection when the latter comes into contact therewith, thus producing the downward or operative movement of the punch.

To guide the projection $b^{31}$ and provide for a direct movement thereof away from the axis around which the cam rotates and at the same time to provide for the lateral movement of said projection due to the curved path in which the end of the lever $b^3$ travels, the said projection has a guide $b^{32}$, radial to and pivoted concentrically with the axis of the cam B, such pivotal support being herein shown as afforded by a collar $b^{33}$, surrounding the disk upon which the said cam B is formed. As shown in Figs. 3 and 4, the said disk has an annular groove extending around its periphery, in which groove the cam projection B is formed and into which groove the projection $b^{31}$ extends, the collar $b^{33}$ having a bearing fit upon the disk itself. By this construction the projection $b^{31}$ is held in the proper relation to the cam B, while the guide therefor is capable of oscillatory movement on the disk to accommodate itself to the curved path of movement of the lever, so that the projection $b^{31}$ can be directly pivoted to the end of the lever without an intermediate link, thus reducing the wearing parts and lessening the liability of imperfect operation caused by such wear. To restore the punch after its operative movement, it is provided with a spring interposed between a collar $b^{34}$, fixed on said projection, and a stud $b^{35}$, which is screwed into the end of the guide $b^{32}$. As herein shown, the projection $b^{31}$ is itself secured by a screw-thread to a head $b^{36}$, which has a direct pivotal connection with the punch-lever $b^3$, so that the projection $b^{31}$ can be adjusted to compensate for wear.

From the foregoing description it will be seen that eyelets can be set at spaces variable within as wide a limit as is desirable for work of any class and that if certain of the eyelets to be set during a continuous run of the machine are to be differently spaced from those set during another part of the run this variation can be accomplished without stopping the machine and without any possibility of spoiling the material by failing to shift the punch so as to properly correspond to the shifting of the feed mechanism, or vice versa. In many classes of work, however, notably in eyeletting shoe-uppers, it is desirable to set eyelets at a certain space apart in a part of the holes and to punch the remainder of the holes without subsequently setting eyelets therein. It is necessary in this case therefore to prevent the eyelets from being presented to the setting devices when the same come together in the operation of the machine. This is herein shown as accomplished by means for preventing the eyelet-chute from moving forward far enough to present an eyelet to the setting device after it has performed its operative movement. The said eyelet-chute $h$ is shown as reciprocating on slides $h^2$, substantially as in the prior patents, above referred to, and is operated by the pitman $h^3$, connected with a wrist-pin B⁴ on the disk B³. The action of the said pitman is such as to normally reciprocate the feed-chute and cause the end thereof to move into the path of the lower set at each upward movement thereof, so that the said set picks up an eyelet therefrom. The machine is herein shown as provided with means for shifting the point of connection between the eyelet-chute and pitman, operating substantially on the principle shown and described in Patent No. 581,856, to Glass and Whittemore, dated May 4, 1897, but differs from the specific construction shown therein, as will be described. The said pitman $h^3$ has a collar $h^4$, in which is supported a disk $h^5$, rotatably mounted on a pin $h^6$, eccentric thereto, which pin is screwed into the chute-frame, the disk being held in position by the head thereof. It will be seen therefore that if the disk is rotated upon the said pin the disk, turning within the ring upon an axis eccentric thereto, will operate as a cam to change the relation of the pitman to the pin aforesaid, and consequently its relation to the eyelet-chute, the point of connection between the eyelet-chute and the pitman, in other words, being shifted to the rear, so that the normal forward movement of the pitman does not produce the normal forward movement of the chute, the latter being arrested before it crosses the path of the lower set.

To operate the device, the disk is shown as provided with an arm $h^8$, having a projection or finger-piece $h^9$, the said arm being fixed with relation to the disk so that if the said finger-piece is moved it will cause the said disk to rotate. As herein shown, the arm $h^8$ is set in a channel in the surface of the disk, and to limit the movement of said arm it is arranged to project beyond the periphery of the disk into engagement with stops on the collar $h^4$, the said stops being herein shown as formed by cutting away a portion of the collar where the arm $h^8$ projects across the same, leaving shoulders which constitute the aforesaid stops. The parts are held in their normal position by a yielding force, as that of a spring $h^{10}$, shown as connected at one end to a projection $h^{12}$ from the arm $h^8$ and at the other end to a clamp $h^{13}$, secured to the pitman, as by screws $h^{14}$. In the normal operation of the machine, therefore, the point of connection between the pitman and the chute is that shown in Fig. 5 and is in such a position that in the forward movement of the pitman the chute will be moved to a position to present an eyelet to the lower set. If, however, it is desired to prevent the eyelets from being presented to the lower set, it is necessary only to press against the finger-piece $h^9$ as the pitman comes forward, thus moving the arm $h^8$ against the stress of the spring $h^{10}$ and rotating the disk, so that the pin which is connected to the chute is shifted to the rear with relation to the pitman and the said chute arrested or caused to stop before it reaches the end of its normal forward movement.

As has been stated, the time at which the eyelet-chute should be arrested is usually when (in eyeleting shoe-uppers) the spacing of the holes is changed after all the eyelets which are to be inserted have been set, so that the holes for the lacing-studs which are subsequently to be inserted may be differently spaced from the eyeleted holes. For this reason it is desirable to have the means for arresting the eyelet-chute coöperate with the means for shifting the feed, and to this end the finger-piece $h^9$ is arranged to be engaged by a lever $n$, which normally stands, as shown in Fig. 5, out of the path of the said finger-piece. The said lever $n$ is shown as connected with the lever $k$, the connection being preferably made by means of a screw $n^2$, which may also serve as a means for connecting the treadle-wire with the lever $k$, as indicated in Fig. 7, and by a supplemental bolt or screw $n^3$, which is fixed with relation to the lever $k$, but which extends through a slot $n^4$ in the lever $n$. This slot affords means for adjusting the position of the lever $n$ relative to that of the lever $k$, so that if the preliminary adjustment of the lever $k$ is such as would normally hold the lever $n$ in the path of the projection $h^9$ the position of said lever $n$ relative to the lever $k$ may be changed so as to prevent the engagement thereby of the finger-piece except when the lever is moved away from its normal position. Furthermore, it is obvious that if the feed is to be changed without preventing the setting of the eyelets the lever $n$ may be released by loosening the nut upon the bolt $n^3$, so that the said lever will remain at its lowest point through the agency of its own weight. As herein shown, however, the said lever does not itself engage the finger-piece $h^9$, but has a lateral projection $n^5$, secured as by a bolt $n^6$ and nut $n^7$, the said projection being readily removable, so that if the lever is to be temporarily rendered inoperative and it is not desired to change the adjustment thereof with relation to the lever $k$ the said projection $n^5$ may be removed to accomplish the purpose.

It is essential in the eyeleting operation that the position of the stock with relation to the punch and setting devices should be properly determined, and to this end the feed-slide is provided with a gage $o$, against which the edge of the stock rests when it is placed in the machine. It is further desirable to change the position of the gage at times during the operation of the machine in order to set one or more eyelets at a greater or less distance from the edge than the remainder of the eyelets, and for this purpose a novel construction and arrangement of the gage or "spreader," as it is sometimes called, are herein shown and form part of the present invention. It is usually essential in practice to vary the position of one only of the eyelet-openings, and the construction herein shown provides for such variation, which can be accomplished by the attendant through the agency of a knob or handle $o^2$, connected with an operating device $o^3$, pivoted at $o^4$ upon a portion of the feed-slide. The gage itself is adjustably secured, as by means of a nut $o^5$, to a slide $o^6$, movable toward and from the punch and setting devices, so that by the movement thereof the position of the gage and that of the stock guided thereby is varied with relation to the said parts, so that the hole punched and eyeleted will be made at a greater or less distance from the edge of the stock in accordance with the position of said gage. The said slide is actuated by the member $o^3$ through the agency of a slide $o^7$, shown as connected with the member $o^3$ and movable substantially at a right angle to the slide $o^6$, the said slide $o^7$ having an inclined surface $o^8$, which may be the edge of a slot cut therein, said surface coöperating with a pin or projection $o^{60}$ upon the slide $o^6$. To move the slide $o^7$ in response to the movement of the member $o^3$ upon its pivot, the said member is shown as provided with a projection $o^{30}$ to engage the said slide, so that by pressing the knob $o^2$ to the right, Fig. 8, the gage $o$ is drawn in the same direction—i. e., away from the punch—causing the edge of the stock to project farther beyond the punch and setting devices, so that the eyeleted hole is farther from the edge.

The movement of the gage is herein shown as limited by the ends of the slot, which affords the inclined bearing-surface $o^8$; but the gage is arranged to maintain its position wherever it may be placed by the attendant through the agency of a yielding pin $o^9$, having a pointed end $o^{10}$, adapted to engage teeth or projections along the side of the guideway in which the slide $o^6$ moves; the said pin being normally pressed outward by means of a spiral spring $o^{12}$, the stress of which can be overcome by the attendant in moving the gage, but is sufficient to prevent the said gage from being accidentally moved in the operation of the device. The gage can therefore be at once adjusted to the desired position by a movement of the member $o^3$, and if it is desired to shift the gage in the operation of the machine it can be set at the beginning of the operation in the position required for setting the first eyelet or uniform line of eyelets and then shifted in either direction, without stopping the machine, to properly gage the stock for setting the remainder of the eyelets.

It is to be noted that nearly every wearing part of the machine is easily adjustable, the main levers having cone-bearings, as described, the punch-operating rod being screw-threaded, the cam-plates $e^4$ movable by screws, &c. To compensate for looseness of the feed-slide $d$ due to wear, the said feed-slide is guided in an undercut socket and its guide-tongue $d^{20}$ is split, as shown at $d^{30}$, a tapered screw $d^4$ being inserted and adapted to spread the said tongue when desired. The construction is clearly shown in Fig. 3ª, the tapered screw $d^{40}$ being shown as provided with a check-nut which bears against the outer surface of the guide-tongue $d^{20}$, so as to hold the same after it has been driven in until the sides of the tongue are sufficiently spread.

While the machine as hereinbefore described is believed to be a practical embodiment of all the features of the present invention, it is not intended to limit the invention to the specific construction and arrangement of each of the various instrumentalities nor to the specific construction of the connecting mechanism whereby they are caused to properly coöperate, since modifications may obviously be made without departing from the invention.

I claim—

1. In an eyeleting-machine, the combination with the punch adapted to operate on the stock in one position, of setting devices adapted to operate on the stock in another position, means for temporarily shifting the position of one of said parts with relation to the other to vary the distance between them, a stock-feeding device to move the stock from the punch to the setting devices, and means for temporarily varying the range of movement of said feeding device to correspond to the change in relative positions of the punch and setting devices, substantially as described.

2. In an eyeleting-machine, the combination with laterally-stationary setting devices, of a punch, a laterally-stationary actuating device for said punch, a stock-feeding device for transferring the stock from the punch to the setting devices; and common means for temporarily shifting the position of said punch with relation to its actuating device and for varying the range of movement of said stock-feeding device to correspond, substantially as described.

3. In an eyeleting-machine, the combination with the punch adapted to operate on the stock in one position, of the eyelet-setting devices, adapted to operate on the stock in another position, a stock-feeding device to advance the stock so that holes punched therein will be successively presented to the said setting devices, an operating-lever for said stock-feeding device, a cam for positively actuating said lever in its movement in each direction, and bearing-plates adjustably connected with said lever to coöperate directly with said cam, substantially as described.

4. In an eyeleting-machine, the combination with the punch, of the eyelet-setting devices, an independent stock-feeding device to advance the stock so that holes punched therein will be successively presented to the said setting devices, said stock-feeding device being positively actuated in its movement in each direction, means for varying the range of movement thereof, adjustable stops for limiting the operative movement of such range-varying means, and means for preventing the effectual operation of the setting devices when the range of movement of the feeding device is varied, substantially as described.

5. In an eyeleting-machine, the combination with the punch adapted to operate upon the stock in one position, of setting devices adapted to operate upon the stock in another position, a stock-feeding device for moving the stock from the punch to the setting devices, means for positively actuating said stock-feeding device in each direction, and means for varying the range of movement thereof, substantially as described.

6. In an eyeleting-machine, the combination with a punch adapted to operate upon the stock in one position, of setting devices adapted to operate upon the stock in another position and to insert an eyelet in the hole previously made by said punch, a stock-feeding device for moving the stock from the punch to the setting devices, said stock-feeding device being positively actuated in its movement in each direction, and common means for varying the range of movement of said feeding device and correspondingly varying the position of said punch with relation to the setting devices, substantially as described.

7. In an eyeleting-machine, the combination with a punch adapted to operate upon the stock in one position, of setting devices adapted to operate upon the stock in another position and to insert an eyelet in the hole previously made by said punch, a stock-feeding device for moving the stock from the punch to the setting devices, said stock-feeding device being positively actuated in its movement in each direction, common means for varying the range of movement of said feeding device and correspondingly varying the position of said punch with relation to the setting devices, and adjustable stops for limiting the operation of said range-varying and punch-shifting means, substantially as described.

8. In an eyeleting-machine, the combination with a punch, of setting devices for inserting an eyelet in the hole previously made by said punch, an independent stock-feeding device for moving the stock from the punch to the setting devices, operating mechanism to positively move the said stock-feeding device in both its operative and return movement, means for shifting the point of connection between the stock-feeding device and its operating mechanism to vary the range of movement thereof, and means for correspondingly shifting the position of the punch in either direction with relation to the setting devices to correspond to the variation of the feed movement, substantially as described.

9. In an eyeleting-machine, the combination with the punch-lever, of the punch mounted in a carriage laterally movable with relation to said punch-lever, of the eyelet-setting devices toward and from which said punch-carriage is adapted to be moved, to vary the distance between said punch and setting devices, a stock-feeding device for transferring the stock from the punch to the setting devices, and common means for positively moving said punch-carriage in either direction and for correspondingly varying the range of movement of the feeding device, substantially as described.

10. In an eyeleting-machine having a punch adapted to operate on the stock in one position and eyelet-setting devices adapted to operate on the stock in another position, the herein-described feeding mechanism for transferring the stock from the punch to the setting devices which comprises separable reciprocating feed members independent of the punch and setting devices, and adapted to close together upon the stock during their movement in one direction and to be separated during their movement in the opposite direction, a main operating-lever or rocker for said members, an intermediate lever directly connected with said feed members, and means for shifting the point of connection between said main and intermediate levers toward or away from the fulcrum of one of said levers without correspondingly changing its relation to the fulcrum of the other lever, substantially as described.

11. The combination with the setting devices, of the punch and punch-carriage movable toward and from the same, the feeding device to transfer the stock from the punch to the setting devices, a main operating-lever for said feeding device, an intermediate lever connected therewith and directly connected with said feeding device, means for shifting the point of connection between said operating-lever and said intermediate lever to thereby move the same toward or from the fulcrum of one of said levers but not toward or from that of the other, and thus vary the range of movement or throw of the feed, and means for thus shifting the point of connection during the operation of the machine, said means being adapted to also positively move the punch-carriage aforesaid to correspond to the variation in the feed movement, substantially as described.

12. In an eyeleting-machine, the combination with the setting devices, of a punch, a lever for operating the same, a sliding connection between said punch and said lever, a vertical guide for said punch laterally movable with relation to said lever, and means for positively moving the said guide in either direction to determine the relative position of the punch and the setting devices, substantially as described.

13. In an eyeleting-machine, the combination with the setting devices, of a punch, a lever for operating the same, a sliding connection between said punch and said lever, a vertical guide for said punch laterally movable with relation to said lever, means for positively moving the said guide in either direction to determine the relation of the punch to the setting devices, and a controlling device connected with said punch-guide whereby the same can be moved at the will of the attendant, substantially as described.

14. In an eyeleting-machine, the combination with the setting devices, of a punch, a lever for operating the same, a sliding connection between said punch and said lever, a vertical guide for said punch laterally movable with relation to said lever, means for positively moving said guide in either direction to determine the relation of the punch to the setting devices, a controlling device connected with said punch-guide whereby the same can be moved at the will of the attendant, and adjustable stops for determining the initial position of said controlling device and for limiting the movement thereof, substantially as described.

15. The combination with the setting devices, of the punch, a laterally-movable guide-carriage for said punch adapted to shift the position of said punch with relation to the said setting devices, a stock-feeding device for transferring the stock from the punch to the setting devices, an operating-lever for said stock-feeding device, an intermediate lever directly connected with said stock-feeding device and with said operating-lever, a movable connecting member connecting said operating and intermediate levers whereby the point of connection between the two can be shifted to vary the range of movement of the intermediate lever, a device for moving said connecting member, and means for varying the position of the punch-carriage, said means being connected with the device for moving the said connecting member, substantially as described.

16. The combination with the setting devices, of the punch, a laterally-movable guide-carriage for said punch adapted to shift the position thereof with relation to the said setting devices, a stock-feeding device for transferring the stock from the punch to the setting devices, an operating-lever for said stock-feeding device, an intermediate lever directly connected with said stock-feeding device and with said operating-lever, a movable connecting member connecting said operating and intermediate levers whereby the point of connection between the two can be shifted to vary the range of movement of the intermediate lever, a controlling device consisting of an arm or lever connected with said member to move the same, a rock-shaft having a crank connected with the punch-guide to change the position of the punch, and a rod or link connecting an arm or projection from said rock-shaft with the controlling-lever aforesaid, substantially as described.

17. The combination with the setting devices, of the punch, a laterally-movable guide-carriage for said punch adapted to shift the position of said punch with relation to the said setting devices, a stock-feeding device for transferring the stock from the punch to the setting devices, an operating-lever for said stock-feeding device, an intermediate lever directly connected with said stock-feeding device and with said operating-lever, a movable connecting member connecting said operating and intermediate levers whereby the point of connection between the two can be shifted to vary the range of movement of the intermediate lever, a controlling device consisting of an arm or lever connected with said member to move the same, a rock-shaft having a crank connected with the punch-guide to change the position of the punch, a rod or link connecting an arm or projection from said rock-shaft with the controlling-lever aforesaid, stops for limiting the movement of said lever, and a rack or support for said stops having a number of openings whereby the said stops may be arranged in any desired position, substantially as described.

18. The combination with the setting devices, of the punch, a laterally-movable guide-carriage for said punch adapted to shift the position of said punch with relation to the said setting devices, a stock-feeding device for transferring the stock from the punch to the setting devices, an operating-lever for said stock-feeding device, an intermediate lever directly connected with said stock-feeding device and with said operating-lever, a movable connecting member connecting said operating and intermediate levers whereby the point of connection between the two can be shifted to vary the range of movement of the intermediate lever, a controlling device consisting of an arm or lever connected with said member to move the same, an eyelet feed-chute for presenting the eyelets to the setting devices, a device for shifting the point of connection between said feed-chute and its operating means to prevent the end of said chute from moving forward into the path of the eyelet-set, and a lever for operating said device, said lever being connected with the controlling-lever for varying the feed throw, substantially as described.

19. The combination with the setting devices, of the punch, a laterally-movable guide-carriage for said punch adapted to shift the position of said punch with relation to the said setting devices, a stock-feeding device for transferring the stock from the punch to the setting devices, an operating-lever for said stock-feeding device, an intermediate lever directly connected with said stock-feeding device and with said operating-lever, a movable connecting member connecting said operating and intermediate levers whereby the point of connection between the two can be shifted to vary the range of movement of the intermediate lever, a controlling device consisting of an arm or lever connected with said member to move the same, an eyelet feed-chute for presenting the eyelets to the setting devices, a device for shifting the point of connection between said feed-chute and its operating means to prevent the end of said chute from moving forward into the path of the eyelet-set, a lever for operating said device, and means for adjustably connecting together the said levers, substantially as described.

20. The combination with the setting devices, of the punch, a laterally-movable guide-carriage for said punch adapted to shift the position of said punch with relation to the said setting devices, a stock-feeding device for transferring the stock from the punch to the setting devices, an operating-lever for said stock-feeding device, an intermediate lever directly connected with said stock-feeding device and with said operating-lever, a movable connecting member connecting said operating and intermediate levers whereby the point of connection between the two can be shifted to vary the range of movement of the intermediate lever, a controlling device consisting of an arm or lever connected with said member to move the same, an eyelet feed-chute for presenting the eyelets to the setting devices, a device for shifting the point of connection between said feed-chute and its operating means to prevent the end of said chute from moving forward into the path of the eyelet-set, a controlling-lever for operating said device, said lever being connected with the controlling-lever for varying the feed throw, and a lateral projection removably secured to the lever which coöperates with the feed-chute removably secured to said lever and arranged to directly coöperate with the device which controls the eyelet-chute, substantially as described.

21. In an eyeleting-machine, the combination with the setting devices, of a punch, a lever for operating the same, a sliding connection between said punch and said lever, a vertical guide for said punch laterally movable with relation to said lever, means for positively moving the said guide in either direction to adjust the punch with relation to the setting devices, and means for locking said guide after the same has been moved to the desired position, substantially as described.

22. In an eyeleting-machine, the combination with the setting devices, of a punch, a lever for operating said punch, a sliding connection between said punch and said lever, a vertical guide for said punch laterally movable with relation to said lever, an actuating member to produce the lateral movement of said guide, and a removable block or plate mounted in a socket in said guide and directly coacting with the actuating member, substantially as described.

23. In an eyeleting-machine, the combination with the punch adapted to act on the material in one position, of the eyelet-setting devices adapted to act on the material in another position, a feeding device for moving the stock from the punch to the setting devices, a lever connected with said feeding device to operate the same, an adjustable bearing for said lever, and means for operating said lever, substantially as described.

24. In an eyeleting-machine, the combination with the punch, of the eyelet-setting devices, a feeding device for moving the stock from the punch to the setting devices, a lever connected with said feeding device to operate the same, a vertical rock-shaft to which said lever is connected, a rod parallel to said rock-shaft, a main operating-lever, a rod parallel to said main lever, and a connecting-link movable along said rods, substantially as described.

25. In an eyeleting-machine, the combination with the punch, of the eyelet-setting devices, a feeding device for moving the stock from the punch to the setting devices, a lever connected with said feeding device to operate the same, a vertical rock-shaft to which said lever is connected, a rod parallel to said rock-shaft, a main operating-lever, a rod parallel to said main lever, a connecting-link movable along said rods, and means for moving said link along said rods during the operation of the machine, substantially as described.

26. In an eyeleting-machine, the combination with the punch, of the eyelet-setting devices, a feeding device for moving the stock from the punch to the setting devices, a lever connected with said feeding device to operate the same, a vertical rock-shaft to which said lever is connected, a rod parallel to said rock-shaft, a main operating-lever, a rod parallel to said main lever, a connecting-link movable along said rods, and means for adjusting the position of said link with relation to said rods, substantially as described.

27. In an eyeleting-machine, the combination with the punch, of the eyelet-setting devices, a feeding device for moving the stock from the punch to the setting devices, a lever connected with said feeding device to operate the same, a vertical rock-shaft to which said lever is connected, a rod parallel to said rock-shaft, a main operating-lever, a rod parallel to said main lever, a connecting-link movable along said rods, and a universal joint connecting said link and said rods, substantially as described.

28. In an eyeleting-machine, the combination with the punch adapted to operate on the stock in one position, of the eyelet-setting devices adapted to operate on the stock in another position, a feeding device for moving the stock from the punch to the setting devices, a main operating-lever for said feeding device, an adjustable bearing for said main lever, and an intermediate lever connected with said feeding device and with said main lever, substantially as described.

29. In an eyeleting-machine, the combination with the punch provided with a laterally-stationary actuating-lever, of the laterally-stationary setting devices, a feeding device for moving the stock from the punch to the setting devices, a lever for operating said feeding device, a cam coöperating with said lever and adapted to move the same positively in each direction, and bearing-plates adjustably connected with said lever and adapted to bear against said cam, substantially as described.

30. In an eyeleting-machine, the combination with the punch, of the setting devices, and a feeding device for moving the stock from the punch to the setting devices, said feeding device comprising a slide and gripper member, an undercut tongue for said slide, said tongue being slotted and provided with a tapered screw entering said slot to separate the sides of said tongue, and an undercut guide-groove for said tongue in the frame of the machine, substantially as described.

31. The combination with the punch, of the pivotally-supported punch-lever for operating the same, a cam coöperating with said punch-lever to rock the same on its pivot and thereby operate the punch, an intermediate member comprising a rod or projection pivotally connected with the said lever and extending therefrom toward the said cam, and a guide for said projection pivoted coaxially with the shaft which carries the cam, substantially as described.

32. The combination with the punch, of the pivotally-supported punch-lever for operating the same, a cam coöperating with said punch-lever to rock the same on its pivot and thereby operate the punch, an intermediate member comprising a rod or projection pivotally connected with the said lever and extending therefrom toward the said cam, a guide for said projection pivoted coaxially with the shaft which carries the cam, and a restoring-spring inclosed in said guide, substantially as described.

33. The combination with the punch, of the pivotally-supported punch-lever for operating the same, a cam coöperating with said punch-lever to rock the same on its pivot and thereby operate the punch, an intermediate member comprising a rod or projection pivotally connected with the said lever and extending therefrom toward the said cam, a guide for said projection pivoted coaxially with the shaft which carries the cam, and means for adjusting the said intermediate member with relation to the punch-lever, substantially as described.

34. The combination with the punch-lever $b^3$, of the operating-cam B, the projection $b^{31}$ extending from the punch-lever to the said cam, the pivoted connecting-piece $b^{36}$ to which said projection is adjustably secured, the guide-tube $b^{32}$ for said projection $b^{31}$, and the collar $b^{33}$ connected with said guide-tube and surrounding the disk upon which the cam B is formed, substantially as described.

35. In a machine for setting eyelets, rivets, and the like; the combination with the punch adapted to operate on the stock in one position; of setting devices adapted to operate on the stock after it has been punched and moved to another position; means for temporarily shifting the position of one of said parts with relation to the other to vary the distance between them; a stock-feeding device independent of said punch and setting devices to move the stock so that the punched opening is carried to a position to receive an eyelet, and to be operated upon by the setting devices; means for temporarily varying the range of movement of said feeding device to correspond to the change in the relative positions of the punch and setting devices; and a common actuating device for said shifting and varying means whereby the change is accomplished by a single operation, substantially as described.

36. The herein-described stock gage or spreader which consists of a gage member adapted to be engaged by the edge of the stock, a slide or carriage to which said member is secured, said slide being movable toward and from the devices which operate upon the stock, a secondary slide having an inclined surface to engage the gage-carriage or a projection therefrom, and an actuating knob or handle for moving said secondary slide, substantially as described.

37. The herein-described stock gage or spreader which consists of a gage member adapted to be engaged by the edge of the stock, a slide or carriage to which said member is secured, said carriage being movable toward and from the devices which operate upon the stock, a secondary slide having an inclined surface to engage the gage-carriage or a projection therefrom, an actuating knob or handle for moving said secondary slide, a guide for said secondary slide having a series of notches along its surface, and a spring-actuated tapered projection secured to said secondary slide and adapted to project into said notches, substantially as described.

38. The combination with the setting devices, of the punch, a feeding device for transferring the stock from the punch to the setting devices, a main operating-lever for said feeding device, an intermediate lever connected with said operating-lever and with the feeding device, and means for shifting the point of connection between said operating-lever and said intermediate lever to thereby move the said point of connection toward or from the fulcrum of one of said levers but not toward or from that of the other, and thus vary the range of movement or throw of the feed, substantially as described.

In testimony whereof we have signed our names to this specification in the presence of two subscribing witnesses.

WALTER L. WHITTEMORE.
PERLEY R. GLASS.

Witnesses:
H. J. LIVERMORE,
NANCY P. FORD.